United States Patent [19]

Brennan

[11] 4,444,918
[45] * Apr. 24, 1984

[54] AROMATIC POLYOLS MADE FROM WASTE STREAMS FROM THE MANUFACTURE OF TEREPHTHALIC ACIDS, ALKYLENE GLYCOLS AND DIBASIC ACIDS

[75] Inventor: Michael E. Brennan, Austin, Tex.

[73] Assignee: Texaco Inc., White Plains, N.Y.

[*] Notice: The portion of the term of this patent subsequent to Mar. 27, 2001 has been disclaimed.

[21] Appl. No.: 443,779

[22] Filed: Nov. 22, 1982

[51] Int. Cl.$^3$ .............................................. C08G 18/14
[52] U.S. Cl. .................................... 521/131; 252/182; 521/48.5; 521/172; 521/173; 528/308.1; 560/92
[58] Field of Search .............. 521/172, 173, 131, 48.5; 528/308.1; 560/92; 252/182

[56] References Cited

U.S. PATENT DOCUMENTS

| | | | |
|---|---|---|---|
| 3,590,070 | 6/1971 | Martin et al. | 560/93 |
| 4,048,104 | 9/1977 | Svoboda et al. | 521/48.5 |
| 4,223,068 | 9/1980 | Carlstrom et al. | 521/48.5 |

*Primary Examiner*—Maurice J. Welsh
*Attorney, Agent, or Firm*—Robert A. Kulason; Jack H. Park; David L. Mossman

[57] ABSTRACT

Mixtures of aromatic polyols containing ester functionalities suitable for use in rigid foams prepared by reacting dibasic acid residues with an alkylene glycol residue, the reaction product of which is reacted with terephthalic acid residues are described. These novel polyols may be blended with conventional polyols to yield excellent rigid foams, thus serving as useful polyol extenders. These low hydroxyl number extender polyols unexpectedly have a low relative viscosity.

19 Claims, No Drawings

AROMATIC POLYOLS MADE FROM WASTE STREAMS FROM THE MANUFACTURE OF TEREPHTHALIC ACIDS, ALKYLENE GLYCOLS AND DIBASIC ACIDS

CROSS-REFERENCES TO RELATED APPLICATIONS

This application is related to U.S. patent application Ser. No. 443,726, filed Nov. 22, 1982, which relates to polyol production from the reaction of polyethylene terephthalate residues with glycols and amino alcohols and U.S. patent application Ser. No. 443,848, filed Nov. 22, 1982, which concerns the use of polyethylene terephthalate waste streams containing mono- and polyethylene glycols as polyol extenders, all filed of even date.

BACKGROUND OF THE INVENTION

1. Field of the Invention

The invention relates to polyols for rigid polyurethane foams and more particularly relates to such aromatic polyester polyols which are made from the waste streams of terephthalic acids, dibasic acids and alkylene glycols.

2. Description of Other Relevant Compounds in the Field

It is known to prepare foam from polyurethanes by the reaction of a polyisocyanate, a polyol and a blowing agent such as a halogenated hydrocarbon, water or both, in the presence of a catalyst. One particular area of polyurethane technology is based upon rigid polyurethane foams.

The art is replete with a wide variety of polyols useful as one of the main components in preparing polyurethanes such as polyurethane foams. As an example, U.S. Pat. No. 2,965,615 suggests use of co-polymers of alkenyl-substituted aromatic compounds such as styrene, and ethylenically unsaturated monohydric alcohols such as allyl alcohol as a useful resinous polyol in urethane production. Also disclosed as useful polyol sources are alkoxylated reaction products of the above co-polymers.

Further, U.S. Pat. No. 4,094,828 describes how a polyol combination comprising a co-polymer of allyl alcohol and styrene and a polyether polyol provides for rigid polyurethane foams possessing unusual dimensional stability and heat distortion properties. Amino polyols may be modified with epoxy resin and alkylene oxides according to the invention disclosed in U.S. Pat. No. 4,309,532. These modified polyols produce rigid polyurethane foams that have higher heat distortion temperatures and better low temperature properties than foams made with polyols not modified in such a fashion.

Rigid foams generally have good insulative properties and are thus desirable for use in building insulation. As with all building materials, it is desirable to provide rigid foams that are as fire resistant as possible. One approach to this goal is to modify the polyol.

Polyisocyanurate foams are a type which are considered to be fire resistant and show low smoke evolution on burning. However, polyisocyanurate foams tend to be brittle or friable. Various types of polyols have been devised to lower the foam friability, but what frequently happens is that the fire and smoke properties of the polyisocyanurate foam deteriorate. Thus, a fine balance exists between the amount and type of polyol one adds to a polyisocyanurate foam formulation in order to maintain maximum flame and smoke resistance while at the same time reach an improvement in foam friability. U.S. Pat. Nos. 4,039,487 and 4,092,276 describe attempts at this fine balance, although each has its disadvantages.

Scrap polyalkylene terephthalate, such as polyethylene terephthalate (PET) is known to be incorporated into polyurethanes. For example, U.S. Pat. No. 4,048,104 relates that polyisocyanate prepolymers for use in polyurethane products may be prepared by combining an organic polyisocyanate with polyols which are the hydroxyl-terminated digestion products of waste polyalkylene terephthalate polymers and organic polyols. A polyol ingredient which is the digestion product of polyalkylene terephthalate residues or scraps digested with organic polyols is also described in U.S. Pat. No. 4,223,068. Another case where terephthalic acid residues are employed is outlined in U.S. Pat. No. 4,246,365 where polyurethanes are made from polyesters containing at least two hydroxyl groups and terephthalic acid residues.

More relevant to the compounds of this invention is the solution proposed in U.S. Pat. No. 4,237,238. In this patent, a polyol mixture is prepared by the transesterification of a residue from the manufacture of dimethyl terephthalate with a glycol, which is then used to produce polyisocyanurate foams having a combination of a high degree of fire resistance with low smoke evolution, low foam friability and high compressive strength. The preparation of such a polyol mixture (from ethylene glycol and dimethyl terephthalate esterified oxidate residue) is described in U.S. Pat. No. 3,647,759. J. M. Hughes and John Clinton, in the Proceedings of the S.P.I. 25th Annual Urethane Division Technical Conference, Scottsdale, Ariz. (October 1979), describe other foams prepared from the polyols of U.S. Pat. No. 3,647,759.

Another type of polyisocyanurate foam employs a polyol blend using both amide diols and primary hydroxyl polyols to give a foam having a high reaction exotherm, making it particularly suited to the preparation of polyisocyanurate foam laminates, according to U.S. Pat. No. 4,246,364.

There is still a need for a rigid polyurethane foam that has a high flame resistance. Part of the problem with the polyols of U.S. Pat. No. 3,647,759 is that they are not very compatible with trichlorofluoromethane, the gas entrapped in closed-cell rigid foams, which accounts for the excellent insulating properties of these foams.

SUMMARY OF THE INVENTION

The invention concerns a mixture of aromatic polyols having hydroxyl and ester functionalities for use in preparing rigid foams, being produced by the process comprising esterifying a dibasic acid residue with an alkylene glycol to form a polyester polyol and subsequently transesterifying a terephthalic ester waste stream with the polyester polyol reaction product.

DETAILED DESCRIPTION OF THE PREFERRED EMBODIMENTS

In general, it has been discovered that rigid foams may be made using the mixture of aromatic polyester polyols of this invention either alone or as polyol extenders together with other polyols. In addition, such a polyol mixture is compatible with the trichlorofluoromethane blowing agent. The novel aromatic polyester polyol mixtures are made by using a terephthalic acid residue. This may be any waste or scrap residue from the manufacture of terephthalic acid, dimethyl terephthalate, polyethylene terephthalate and the like. The residue must contain compounds which have the moiety

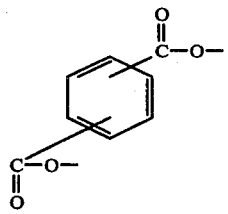

One such suitable residue is the dimethyl terephthalate (DMT) residue described in U.S. Pat. No. 3,647,759, incorporated herein by reference. However, the co-reactant is not ethylene glycol as in U.S. Pat. No. 3,647,759, but rather a polyester polyol produced by the esterification of a dibasic acid with an alkylene glycol or an alkylene glycol waste stream. The result is a novel mixture of aromatic polyols having ester functionalities of low average hydroxyl number and surprisingly low viscosity.

The term "DMT residue" refers to the purged residue which is obtained during the manufacture of DMT in which p-xylene is oxidized and the crude oxidation product is then esterified with methanol to yield the desired product in a reaction mixture along with a complex mixture of by-products. The desired DMT is removed from the reaction mixture with the volatile methyl p-toluate by-product by distillation leaving a residue. The DMT and methyl p-toluate are separated. Some of the residue is purged from the process while the remainder of the residue and the methyl p-toluate are recycled for oxidation. It is this purged residue which is reacted herein to yield useful polyester polyol products.

U.S. Pat. No. 3,647,759 describes in detail the residue set forth above and characterizes its properties. Residues from the manufacture of polyethylene terephthalate would also be expected to be useful in making polyols by this process.

These DMT residues may contain DMT, substituted benzenes, polycarbomethoxy diphenyls, benzyl esters of the toluate family, dicarbomethoxy fluorenone, carbomethoxy benzocoumarins and carbomethoxy polyphenyls. The substituted benzenes, dicarbomethoxy fluorenone and carbomethoxy benzocoumarins are also present in small amounts. Dimethyl terephthalate may be present in amounts ranging from 6 to 65% of the DMT residue. Hercules, Inc., Wilmington, Del., sells these DMT residues under the tradename of TERATE®101. Hercules also sells TERATE 200 series resins which are DMT resins modified with a glycol as seen in U.S. Pat. Nos. 4,237,238 and 3,647,759. Similar DMT residues having a different composition but still containing the aromatic, esters and acids are also sold by DuPont and others.

It is expected that useful novel aromatic polyol mixtures may be made with polyethylene terephthalate (PET) in place of the DMT residue. The reactions would proceed as usual and an aromatic polyol having hydroxyl and ester functionalities would result.

The polyester polyol with which the terephthalic acid residue is reacted is produced by the esterification of a residue of dibasic acid manufacture, as noted before. Dibasic acids are those acids which have two displaceable hydrogen atoms. Examples of such acids are succinic, glutaric and adipic acid. Especially preferred are the residues from adipic acid which contain portions of each of the three acids listed above. It is necessary that the acids be dibasic so that polymer chains can be formed upon reaction with the glycol.

Preferably, the alkylene glycol has the formula

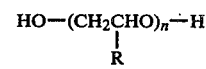

where R is hydrogen or lower alkyl of one to four carbon atoms and n is from 1 to 3. Glycols which meet this definition are ethylene glycol, propylene glycol (1,2-propylene glycol), diethylene glycol (DEG), dipropylene glycol, and triethylene glycol (TEG), among others.

The proportions of the reactants should be such as to give a resulting mixture of aromatic polyester polyols which have an average OH (hydroxyl) number within the desired range of about 100 to 400. The saponification number of the terephthalic acid residue (a measure of transesterification sites) should be considered in selecting proportions. Preferably the approximate equivalents ratio of terephthalic acid residue to polyester polyol reaction product should be from 1:1 to 1:3. What actually forms the "polyol" of this invention is a mixture of polyols having ester functions, even though the mixture is sometimes referred to as a singular "polyol".

The polyester polyol which results from the reaction of the dibasic acid residue and an alkylene glycol may be a diester diol. Such a diol may be defined by the formula

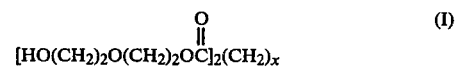

where x is 2 to 4.

Generally, both reactions need heat between ambient and about 300° C. to proceed. Preferably, the temperature for both steps should be between 160° and 240° C. The pressure can be atmospheric or subatmospheric. The polyol should have a hydroxyl number in the range of 100 to 400, with an especially preferred hydroxyl number range of 125 to 300.

These mixtures can serve as polyol extenders when they are blended with conventional polyols for use in polyurethane foams. The polyols of this invention can also be used alone to prepare isocyanurate foams.

There is good compatibility of the polyols of this invention with trichlorofluoromethane. Trichlorofluoromethane, sold under the tradename FREON®R11B, a conventional blowing agent, is the gas entrapped in closed-cell rigid foams which accounts for the excellent insulating properties of these foams.

The second constituent of the overall polyol combination found particularly useful in preparing rigid polyurethane foams is a polyether polyol having a hydroxyl number of 200–800. Usually the polyether polyol comprises 0–95 percent by weight of the total polyol combination weight. Preferred polyether polyols of this type are the reaction products of a polyfunctional active hydrogen initiator and propylene oxide, ethylene oxide or mixed propylene oxide and ethylene oxide. The polyfunctional active hydrogen initiator most preferably has a functionality of 2–8.

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, polypropylene glycol, glycerine, sorbitol, and trimethylolpropane.

Such above amines or alcohols may be reacted with an alkylene oxide such as ethylene oxide, propylene oxide, or mixed ethylene oxide and propylene oxide using techniques known to those skilled in the art. Thus, for example, the reaction of alkylene oxide with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol would determine the amount of alkylene oxide used to react with the initiator. As noted above, the polyether polyols useful here have a hydroxyl number ranging from about 200 to about 800. The reaction mixture is then neutralized and water and excess reactants are stripped from the polyol. The polyether polyol may be prepared by reacting the initiator with propylene oxide or ethylene oxide, or by reacting the initiator first with propylene oxide followed by ethylene oxide or vice versa in one or more sequences to give a so-called block polymer chain or by reacting the initiator at once with propylene oxide and ethylene oxide mixture to achieve a random distribution of such alkylene oxides.

Especially preferred as the second polyol constituent are the nitrogen-containing polyether polyols described in U.S. Pat. Nos. 3,297,597 and 4,137,265, incorporated by reference herein. These particularly preferred polyols are marketed by Texaco Chemical Company as THANOL ®R-350-X and THANOL R-650-X polyols. These polyols are prepared by reacting from 2 to 3 moles of propylene oxide with one mole of the Mannich reaction product of a mole of phenol or nonylphenol with one or two moles of diethanolamine.

The final polyol combination more preferably comprises 0–95 percent by weight of said polyether polyol and 100–5 percent by weight of aromatic polyester polyol. Although the aromatic polyols of this invention may be used alone, it is preferred that they be present in an amount of from 30 to 70 weight percent of the polyol blend. The polyol combination in many instances has a total hydroxyl number ranging from about 200 to about 600. A preferred range is a hydroxyl number of from 300 to 500.

Any aromatic polyisocyanate may be used in the practice of the instant invention. Typical aromatic polyisocyanates include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl)methane, bis(3-methyl-4-isocyanatophenyl)methane, and 4,4'-diphenylpropane diisocyanate.

Greatly preferred aromatic polyisocyanates used in the practice of the invention are methylene-bridged polyphenyl polyisocyanate mixtures which have afunctionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents; for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 weight percent methylene diphenyl diisocyanate isomers with the remainder being polymethylene polyphenyl diisocyanates having higher functionalities and higher molecular weights. Typical of these are polyphenyl polyisocyanate mixtures containing about 20 to 100 weight percent methylene diphenyl diisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. The isocyanate mixtures are known commercially available materials and can be prepared by the process described in U.S. Pat. No. 3,362,979, issued Jan. 9, 1968 to Floyd E. Bentley.

In the production of rigid polyurethane foams in the practice of the invention, other known additives are necessary. One such constituent is the blowing agent. Some examples of such material are trichloromonofluoromethane, dichlorodifluoromethane, dichloromonofluoromethane, 1,1-dichloro-1-fluoroethane, 1,1-difluoro-1,2,2-trichloroethane, chloropentafluoroethane, and the like. Other useful blowing agents include low-boiling hydrocarbons such as butane, pentane, hexane, cyclohexane, and the like. See U.S. Pat. No. 3,072,582, for example. The polyols of this invention are quite compatible with fluorocarbon blowing agents unlike some of the prior art polyols which are also made from DMT residues.

Surfactant agents, better known as silicone oils, are added to serve as a cell stabilizer. Some representative materials are sold under the names of SF-1109, L-520, L-521 and DC-193 which are, generally, polysiloxane polyoxyalkylene blocked co-polymers, such as those disclosed in U.S. Pat. Nos. 2,834,748; 2,917,480; and 2,846,458, for example.

Should fire retardancy be required for the polyurethane foam, two types of fire retardants are available; those that are incorporated by mere mechanical mixing and those that become chemically bound in the polymer chain. Representative of the first type are tris(chloroethyl)phosphate, tris(2,3-dibromopropyl)phosphate, diammonium phosphate, various halogenated compounds and antimony oxide. Representative of the chemically bound type are chlorendic acid derivatives, and various phosphorous-containing polyols.

The catalysts which may be used to make the foams of this invention are well known. There are two general types of catalyst, tertiary amines and organometallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in this invention are triethylenediamine, tetramethylethylenediamine, triethylamine, tripropylamine, tributylamine, triamylamine, pyridine, quinoline, dimethylpiperazine, dimethylhexahydroaniline, piperazine, N-ethylmorpholine, 2-methylpiperazine, dimethylaniline, nicotine, dimethylaminoethanol, tetramethylpropanediamine and methyltriethylenediamine. Useful organometallic compounds as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organometallic compound are often used together in the polyurethane reaction.

The rigid polyurethane foams prepared here can be made in one step by reacting all the ingredients together at once (one-shot process) or the rigid foams can be made by the so-called "quasi-prepolymer method." In accordance with this method, a portion of the polyol component is reacted in the absence of a catalyst with the polyisocyanate component in proportion so as to provide from about 20 percent to about 40 percent of free isocyanato groups in the reaction product, based on the polyol. To prepare foam, the remaining portion of the polyol is added and the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component, whereby at the end of the reaction a rigid polyurethane foam is provided.

In a preferred embodiment the amount of polyol combination is used such that the isocyanato groups are present in the foam in at least an equivalent amount, and preferably in slight excess, compared with the free hydroxyl groups. Preferably, the ingredients will be proportional so as to provide for about 1.05 to about 8.0 mole equivalents of isocyanato groups per mole equivalent of hydroxyl groups.

The invention will be illustrated further with respect to the following specific examples, which are given by way of illustration and not given as limitations on the scope of this invention. The synthesis of the polyols of this invention will be presented along with examples of how these polyol mixtures are used as polyol extenders to prepare foams.

EXAMPLE I

Esterification of Waste Dibasic Acid Stream Diethylene Glycol

A 2-liter three-neck round bottom flask equipped with a thermometer (Therm-O-Watch), magnetic stirring bar, nitrogen inlet, distillation head with water cooled condenser and a tared receiver, was charged with 521.8 g (4.04 moles) of DuPont sold dibasic acid (56% glutaric acid, 23% succinic acid, 20% adipic acid, ~1% organic nitrogen compounds, ~0.2% nitric acid; 868.22 acid no., 0.41% N, 0.82% water, 221 ppm copper and 162 ppm vanadium) and 857.2 g (8.08 moles) DEG. The whole was then stirred and heated under nitrogen. The reaction solution became homogeneous at 100° C. Distillate (132.0 g; 98.1% water) was collected overhead at 85°-99° C./144°-215° C. (pot)/1 atm. over 3⅜ hours. The bottoms product (1244.0 g), a dark mobile liquid, was recovered after cooling under nitrogen to room temperature. Total recovery was 99.78%. Proton nuclear magnetic resonance spectra confirmed the product structure to be a diester diol of formula (I).

Product analyzed as follows:
Hydroxyl number—368
Acid number—26.12
Saponification number—342.06
Water, %—0.83
Nitrogen, %—0.07
Viscosity, cs, 25° C.—165
Copper, ppm—47.2
Vanadium, ppm—27.3

EXAMPLE II

Glycol Residue (DEG, TEG, etc.)

As in the previous reaction, 537.5 g (4.16 moles) dibasic acid (DBA) was reacted with 1085.8 g (8.32 moles) glycol residue (Texaco Chemical; 860 hydroxyl number, 1.65% water; molecular weight average of 130.5). In this case, a homogeneous reaction solution was obtained at 90° C. Distillate (160.0 g; 98.1% water) was collected overhead at 66°-115° C./151°-215° C. (pot)/1 atm over 4 1/6 hours. Product (1458.5 g) was again a dark, mobile liquid. Total recovery was 99.7%. Product structure was shown to be a diester diol by nuclear magnetic resonance analysis. The product analyzed as follows:

Hydroxyl number—330
Acid number—13.02
Saponification number—304.24
Water, %—0.65
Viscosity, cs, 25° C.—323
Copper, ppm—20.2
Vanadium, ppm—28.1

EXAMPLE III

Transesterification of Dimethylterephthalate (DMT)—High Boiling Residue (HBR)

DMT-HBR (DuPont) is the residue stream available from DMT manufacture. It consists of 50–65% DMT, 2–6% monomethyl terephthalate, 0–3% terephthalic acid, 30–40% of the methyl and benzyl esters of benzene di- and tricarboxylic acids and biphenyl di- and tricarboxylic acids in addition to substituted fluorenone, benzocoumarin and various monofunctional derivatives. The sample analyzed as follows:

Saponification number—553
Acid number—21
Ash, wt.%—0.19
Manganese, wt.%—0.15
Cobalt, ppm—424
Phosphorus, ppm—313
Iron, ppm—197
Nickel, ppm—130

EXAMPLE IV

DMT-HBR/DBA-DEG

A 1-liter three-neck round bottom flask, equipped with a thermometer (Therm-O-Watch), mechanical stirrer, nitrogen inlet, distillation head with water cooled condenser, and a tared receiver, was charged with 180.5 g DMT-HBR from Example III (a black solid) and 500.0 g (1.64 moles) DBA-DEG diester diol (Example I, hydroxyl number 368). The whole was then stirred and heated under nitrogen. Distillate (43.6 g, 26.2% water and the remainder mostly methanol) was collected overhead at 91°–66° C./204°–240° C. (pot)/1 atm. over 3⅜ hours. The bottoms product (634.0 g), a dark mobile liquid, was recovered after cooling under nitrogen to room temperature. Total recovery was 99.57%. The product analyzed as follows:

Hydroxyl number—179
Acid number—3.91
Saponification number—432.88
Water, %—0.13
Ash, %—0.35
Viscosity, cs, 25° C.—2,306
Manganese, ppm—304
Cobalt, ppm—382
Iron, ppm—121
Copper, ppm—26
Vanadium, ppm—28

EXAMPLE V

DMT-HBR/DBA-GR

As in the previous reaction, 150.0 g DMT-HBR from Example III was reacted with 488.0 g (1.44 moles) DBA-GR diester diol (Example 2, hydroxyl number 330). Distillate (40.7 g, 21.3% water and the remainder mostly methanol) was collected overhead at 70-95-61° C./192°–240° C. (pot)/1 atm. over 3.0 hours. The product, a dark mobile liquid, analyzed as follows: (604.0 g; total recovery, 99.79%)

Hydroxyl number—132
Acid number—8.02
Saponification number—385.0
Water, %—0.12
Ash, %—0.54
Viscosity, cs, 25° C.—5,598
Manganese, ppm—893
Cobalt, ppm—430
Iron, Fe—256
Copper, ppm—26
Vanadium, ppm—27

EXAMPLE VI

Cleavage/Esterification of Polyethyleneterephthalate (PET) Still Bottoms or "Glycol Sludge" from American Enka Analysis of these still bottoms gave the following results:

Hydroxyl number—501
Saponification number—367.54
Acid number—14.55
Water, %—0.88
Ash, wt.%—1.33
Antimony, wt.%—0.325
Cobalt, ppm—701

EXAMPLE VII

Rohm & Haas PET Still Bottoms

Analysis of these still bottoms gave the following results:

Hydroxyl number—236
Saponification number—306
Acid number—3.0
Ash, %—0.6
Antimony, wt.%—0.75
Phosphorus, ppm—564

EXAMPLE VIII

Process Utilizing Preformed Aliphatic Diester Diol

A 250-ml three-neck round bottom flask, equipped with a mechanical stirrer, thermometer (Therm-O-Watch), water cooled distillation head, $N_2$ inlet, and a tared receiver, was charged with 71.2 g "glycol sludge" (American Enka) and 96.9 g (0.32 mole) DBA-DEG from Example I; therefore, a reactant ratio of 1:1, basis hydroxyl number. The whole was then heated and stirred under a nitrogen atmosphere at atmospheric pressure. The reaction solution became homogeneous at 145° C. The reaction mixture was held at 200°–240° C. for 2.5 hrs.; a small amount of distillate (3.2 g; 88.8% water) was collected at a head temperature of 71° C. max. Product (164.0 g.; 99.5% total recovery) analyzed as follows:

Hydroxyl number—412
Acid number—1.49
Saponification number—369.5
Water, %—0.15
Viscosity, cs, 25° C.—630
Antimony, wt.%—0.13
Cobalt, ppm—407

EXAMPLE IX

Procedure was the same as in Example VIII. There were used 104.0 g PET still bottoms (Rohm & Haas) and 66.7 g (0.22 mole) DBA-DEG from Example I. Therefore, the ratio was 1:1, basis hydroxyl number. The reaction took 3.0 hours at 200°–240° C. to give a distillate: 2.2 g, product: 167.0 g (contains solids) and filtered product: 145.5 g with the following properties.

Hydroxyl number—310
Acid number—1.88
Saponification number—388.91
Water, %—0.12
Viscosity, cs, 25° C.—1,281
Antimony, wt.%—0.12
Phosphorus, ppm—69

EXAMPLE X

Same procedure as in Example VIII. These were used 95.1 g PET still bottoms (Rohm & Haas) and 95.6 g (0.26 mole) DBA-GR from Example II. Therefore, the ratio was 1:1, basis saponification number. The reaction took 5.5 hours at 200°–240° C. to give a distillate: 4.2 g (69.7% water), Product: 184.5 g (contains solids) and filtered product: 137.0 g with the following properties.

Hydroxyl number—236
Acid number—2.43
Saponification number—378.61
Water, %—0.15
Viscosity, cs, 25° C.—2,588
Antimony, ppm—635

Phosphorus, ppm—109

EXAMPLE XI

Same procedure as in Example VIII. There were used 86.3 g "glycol sludge" (American Enka) and 104.2 g (0.28 mole) DBA-GR from Example II. Therefore, the ratio was 1:1, basis saponification number. The reaction took 4.0 hrs. at 200°–240° C. to give a distillate: 8.0 g (87.5% water), product: 179.5 g (98.4% total recovery) having the following properties.
Hydroxyl number—332
Acid number—1.87
Saponification number—422.08
Water, %—0.09
Viscosity, cs, 25° C.—1,279
Antimony, wt.%—0.14
Cobalt, ppm—558

EXAMPLE XII

One-Pot Process

A 1-liter three-neck round bottom flask, equipped with a mechanical stirrer, thermometer (Therm-O-watch), distillation head with water cooled condenser, $N_2$ inlet and a tared receiver, was charged with 292.5 g (1.03 equiv., basis saponification number) "glycol sludge" (American Enka) from Example VI, 132.1 g (1.03 moles) Monsanto flaked AGS (14% adipic acid, 58% glutaric acid, 23% succinic acid, 1% other dibasic acids, 1% monobasic acids, ~0.2% organic nitrogen compounds, ~2% other organics, ~0.05% nitric acid; 874.07 acid no., 0.5% N, 0.74% water, 2.72 ppm copper and 567 ppm vanadium), and 218.4 g (2.06 moles) diethylene glycol (DEG). The whole was then stirred and heated under nitrogen. Distillate (57.0 g; 96.7% water) was collected overhead at 92-114-67° C./145°–230° C. (pot)/1 atm. over 3.0 hours, the final hour of which was at 200°–230° C. The bottoms product (583.0 g), a mobile dark liquid, was recovered after cooling under nitrogen to room temperature. Total recovery was 99.5%. Product analyzed as follows:
Hydroxyl number—428
Acid number—4.37
Saponification number—372.63
Water, %—0.16
Viscosity, cs, 25° C.—637
Cobalt, ppm—562
Antimony, wt.%—0.155

EXAMPLE XIII

As in the previous reaction, 284.2 g (1.0 equiv., basis saponification number) "glycol sludge" (American Enka from Example VI) was reacted with 128.3 g (1.0 mole) AGS flakes (Monsanto) and 261.0 g (2.0 moles) glycol residue (Texaco Chemical; 860 hydroxyl number; 1.65% water; molecular weight average of 130.5). In this case, distillate (63.0 g; 92.8% water) was collected overhead at 80-105-65° C./150°–240° C. (pot)/1 atm. over 4.5 hours, the final two hours of which were at 205°–240° C. Product (601.0 g, total recovery, 98.6%) a mobile dark liquid, analyzed as follows:
Hydroxyl number—375
Acid number—3.23
Saponification number—350.08
Water, %—0.06
Viscosity, cs, 25° C.—1,115
Cobalt, ppm—554
Antimony, wt.%—0.1455

Preparation of Fire Retarded Rigid Polyurethane Foams

Rigid foams were prepaed from 70:30 wt.% ratio polyol blends of THANOL ® R-350-X or THANOL R-650-X with the new extenders of this invention and from TERATE 203 and CHEMPOL 30-2150. The polyols THANOL R-350-X and R-650-X are described in U.S. Pat. Nos. 3,297,597 and 4,137,265, respectively. The formulation components were mixed at 2700 rpm and poured into either an 5"×8"×6" (200 g pour) or an 8"×8"×12" (600 g pour) open mold and allowed to rise. The resulting foams were allowed to stand at room temperature for at least three days before testing. Formulations and foam physical properties are listed below.

EXAMPLE XIV

THANOL ® R-350-X-Formulation

|  | A | B | C | D |
|---|---|---|---|---|
| Formulation, pbw |  |  |  |  |
| THANOL R-350-X (OH=534) | 26.1 | 26.6 | 25.5 | 26.4 |
| Polyol, Ex. III (OH=179) | 11.2 | — | — | — |
| Polyol, Ex. IV (OH=132) | — | 11.4 | — | — |
| TERATE ® 203[1] (OH=318) | — | — | 10.9 | — |
| CHEMPOL[2] 30-2150 (OH=210) | — | — | — | 11.3 |
| FYROL PCF[3] | 5.0 | 5.0 | 5.0 | 5.0 |
| Water | 0.3 | 0.3 | 0.3 | 0.3 |
| FREON R-11B[4] | 13.0 | 13.0 | 13.0 | 13.0 |
| L-5420[5] | 0.5 | 0.5 | 0.5 | 0.5 |
| FOMREZ UL-32[6] | 0.01 | 0.01 | 0.01 | 0.01 |
| PAPI 27[7] or MONDUR MR[8] |  |  |  |  |
| Index = 1.15, 1.15, 1.10, 1.15 | 43.9 | 43.2 | 44.8 | 43.5 |
| Times, seconds, mixing | 12 | 12 | 10 | 9 |
| Times, seconds, cream | 17 | 15 | 15 | 17 |
| Times, seconds, gel | 59 | 61 | 57 | 67 |
| Times, seconds, tack free | 97 | 97 | 83 | 113 |
| Times, seconds, rise | 133 | 131 | 115 | 150 |
| Initial surface friability | None | None | None | None |
| Foam appearance | Good | Good | Good | Good |
| Physical Properties |  |  |  |  |
| Density, lbs/ft$^3$ | 1.72 | 1.63 | 1.68 | 1.72 |
| K-factor | 0.124 | 0.120 | 0.110 | 0.124 |
| Compressive strength, psi |  |  |  |  |
| with rise | 34.69 | 30.81 | 37.13 | 40.20 |
| against rise | 12.00 | 12.58 | 12.69 | 11.17 |
| Heat distortion, °C. | 107 | 107 | 129 | 118 |
| % closed cells | 92.59 | 91.64 | 93.64 | 91.19 |
| Friability, wt. % loss |  |  |  |  |
| 10 min | 3.80 | 3.01 | 2.35 | 2.60 |
| ASTM 1692 Burn, in/min (BHA) | 1.90 | 2.06 | 2.08 | 1.63 |
| Butler Chimney Test |  |  |  |  |
| Flame height, in | >11 | >11 | >11 | >11 |
| Seconds to extinguish | 14.0 | 13.0 | 14.0 | 14.0 |
| Wt. % retained | 70.8 | 67.3 | 78.2 | 69.4 |

[1]A DMT resin modified with a glycol, sold by Hercules, Inc., described in U.S. Pat. Nos. 4,237,238 and 3,647,759
[2]Reaction product of recycled PET, DEG and pure dimethyl glutarate sold by Freeman Chemical Co.
[3]Fire retardant sold by Stauffer Chemical Co.
[4]Trichlorofluoromethane
[5]A silicone surfactant sold by Union Carbide Corp.
[6]A tin catalyst sold by Witco Chemical Corp.
[7]A polymeric isocyanate sold by Upjohn
[8]A polymeric isocyanate sold by Mobay Chemical Corp.

EXAMPLE XV

THANOL ® R-650-X Formulation

|  | E | F | G | H |
|---|---|---|---|---|
| Formulation, pbw |  |  |  |  |
| THANOL R-650-X (OH=455) | 28.1 | 28.6 | 27.2 | 28.3 |

-continued

|  | E | F | G | H |
|---|---|---|---|---|
| Polyol, Example III (OH=179) | 12.0 | — | — | — |
| Polyol, Example IV (OH=132) | — | 12.3 | — | — |
| TERATE 203 (OH=318) | — | — | 11.7 | — |
| CHEMPOL 30-2150 (OH=210) | — | — | — | 12.1 |
| FYROL PCF | 5.0 | 5.0 | 5.0 | 5.0 |
| Water | 0.3 | 0.3 | 0.3 | 0.3 |
| FREON R-11B | 13.0 | 13.0 | 13.0 | 13.0 |
| L-5420 | 0.5 | 0.5 | 0.5 | 0.5 |
| FOMREZ UL-32 | 0.01 | 0.01 | 0.01 | 0.01 |
| PAPI 27 or MONDUR MR Index = 1.15, 1.15, 1.10, 1.15 | 41.1 | 40.3 | 42.3 | 40.8 |
| Times, seconds, mixing | 9 | 9 | 10 | 8 |
| Times, seconds, cream | 14 | 13 | 12 | 17 |
| Times, seconds, gel | 55 | 50 | 50 | 65 |
| Times, seconds, tack free | 85 | 70 | 60 | 99 |
| Times, seconds, rise | 132 | 138 | 84 | 156 |
| Initial surface friability | None | None | None | None |
| Foam appearance | Good | Good | Good | Good |
| Physical Properties | | | | |
| Density, lbs/ft³ | 1.84 | 1.85 | 1.78 | 1.88 |
| K-factor | 0.126 | 0.117 | 0.113 | 0.120 |
| Compressive strength, psi | | | | |

-continued

|  | E | F | G | H |
|---|---|---|---|---|
| with rise | 32.65 | 31.65 | 35.08 | 40.93 |
| against rise | 12.39 | 11.59 | 12.58 | 11.64 |
| Heat distortion, °C. | 102 | 103 | 138 | 110 |
| % Closed cells | 92.64 | 93.07 | 94.86 | 92.55 |
| Friability, wt. % loss, 10 min | 3.82 | 2.93 | 2.37 | 1.30 |
| ASTM 1692 Burn, in/min (BHA) | 1.75 | 2.01 | 2.36 | 2.08 |
| Butler Chimney Test | | | | |
| Flame height, in | >11 | >11 | 9 | >11 |
| Seconds to extinguish | 13.0 | 12.0 | 12.3 | 11.0 |
| Wt. % retained | 71.0 | 69.3 | 79.0 | 73.5 |

EXAMPLE XVI

THANOL® R-350-X and R-650-X Formulations (Comparative Examples)

|  | I | C | D | J | G | H |
|---|---|---|---|---|---|---|
| Formulation, pbw | | | | | | |
| THANOL R-350-X (OH=534) | 33.8 | 25.5 | 26.4 | — | — | — |
| THANOL R-650-X (OH=455) | — | — | — | 37.0 | 27.2 | 28.3 |
| TERATE 203 (OH=318) | — | 10.9 | — | — | 11.7 | — |
| CHEMPOL 30-2150 (OH=210) | — | — | 11.3 | — | — | 12.1 |
| FYROL PCF | 5.0 | 5.0 | 5.0 | 5.0 | 5.0 | 5.0 |
| Water | 0.3 | 0.3 | 0.3 | 0.3 | 0.3 | 0.3 |
| FREON R-11B | 13.0 | 13.0 | 13.0 | 13.0 | 13.0 | 13.0 |
| L-5420 | 0.5 | 0.5 | 0.5 | 0.5 | 0.5 | 0.5 |
| FOMREZ UL-32 | 0.01 | 0.01 | 0.01 | 0.01 | 0.01 | 0.01 |
| MONDUR MR (index = 1.1, 1.1, 1.15) | 47.4 | 44.8 | 43.5 | 44.2 | 42.3 | 40.8 |
| Times, seconds, mixing | 10 | 10 | 9 | 8 | 10 | 8 |
| Times, seconds, cream | 26 | 15 | 17 | 12 | 12 | 17 |
| Times, seconds, gel | 66 | 57 | 67 | 51 | 50 | 65 |
| Times, seconds, tack free | 98 | 83 | 113 | 64 | 60 | 99 |
| Times, seconds, rise | 105 | 115 | 150 | 109 | 84 | 156 |
| Initial surface friability | None | None | None | None | None | None |
| Foam appearance | Very Good | Good | Good | Very Good | Good | Good |
| Physical Properties | | | | | | |
| Density, lbs/ft³ | 1.87 | 1.68 | 1.72 | 1.74 | 1.78 | 1.88 |
| K-factor | 0.118 | 0.110 | 0.124 | 0.118 | 0.113 | 0.120 |
| Compressive strength | | | | | | |
| with rise | 41.44 | 37.13 | 40.20 | 35.94 | 35.08 | 40.93 |
| against rise | 19.26 | 12.69 | 11.17 | 14.32 | 12.58 | 11.64 |
| Heat distortion, °C. | 152 | 129 | 118 | 137 | 138 | 110 |
| % closed cells | 91.79 | 93.64 | 91.19 | 92.02 | 94.86 | 92.55 |
| Friability, wt. % loss, 10 min | 8.18 | 2.35 | 2.60 | 6.19 | 2.37 | 1.30 |
| ASTM 1692 Burn, in/min (BHA) | 2.49 | 2.08 | 1.63 | 2.97 | 2.36 | 2.08 |
| Butler Chimney Test | | | | | | |
| Flame height, in | >11 | >11 | >11 | >11 | 9 | >11 |
| Seconds to extinguish | 19.0 | 14.0 | 14.0 | 14.0 | 12.3 | 11 |
| Wt. % retained | 59.7 | 78.2 | 69.4 | 63.9 | 79.0 | 73.5 |

EXAMPLE XVII

THANOL® R-350-X Formulations (Inventive Examples)

|  | K | L | M | N | O | P |
|---|---|---|---|---|---|---|
| Formulation, pbw | | | | | | |
| THANOL R-350-X (OH=534) | 24.0 | 24.7 | 24.85 | 25.55 | 24.6 | 25.1 |
| Polyol, Example VIII (OH=412) | 10.3 | — | — | — | — | — |
| Polyol, Example XI (OH=332) | — | 10.6 | — | — | — | — |
| Polyol, Example IX (OH=310) | — | — | 10.65 | — | — | — |
| Polyol, Example X (OH=236) | — | — | — | 10.95 | — | — |
| Polyol, Example XII (OH=428) | — | — | — | — | 10.6 | — |
| Polyol, Example XIII (OH=375) | — | — | — | — | — | 10.8 |
| FYROL PCF | 5.0 | 5.0 | 5.0 | 5.0 | 5.0 | 5.0 |
| Water | 0.3 | 0.3 | 0.3 | 0.3 | 0.3 | 0.3 |
| FREON R-11B | 13.0 | 13.0 | 13.0 | 13.0 | 12.5 | 12.5 |
| L-5420 | 0.5 | 0.5 | 0.5 | 0.5 | 0.5 | 0.5 |
| FOMREZ UL-32 | 0.01 | 0.01 | 0.01 | 0.01 | 0.01 | 0.01 |
| PAPI 27, index = 1.15, 1.1 | 46.9 | 45.9 | 45.7 | 44.7 | 46.5 | 45.8 |

|                              | K     | L     | M     | N     | O     | P     |
|------------------------------|-------|-------|-------|-------|-------|-------|
| Times, seconds, mixing       | 8     | 8     | 8     | 8     | 6     | 6     |
| Times, seconds, cream        | 11    | 11    | 10    | 11    | 12    | 13    |
| Times, seconds, gel          | 41    | 45    | 43    | 56    | 36    | 44    |
| Times, seconds, tack free    | 63    | 65    | 67    | 89    | 55    | 65    |
| Times, seconds, rise         | 93    | 95    | 101   | 126   | 104   | 102   |
| Initial surface friability   | None  | None  | None  | None  | None  | None  |
| Foam appearance              | Good  | Good  | Good  | Good  | Good  | Good  |
| Physical Properties      |       |       |       |       |       |       |
| Density, lbs/ft³             | 1.78  | 1.79  | 1.83  | 1.77  | 1.67  | 1.66  |
| K-factor                     | —     | —     | —     | —     | 0.120 | 0.128 |
| Compressive strength, psi    |       |       |       |       |       |       |
| with rise                    | 36.62 | 33.54 | 34.54 | 38.74 | 35.04 | 36.17 |
| against rise                 | 13.30 | 11.73 | 12.48 | 11.95 | 10.46 | 10.51 |
| Heat distortion, °C.         | 109   | 109   | 106   | 102   | 116   | 114   |
| % closed cells               | 91.42 | 93.31 | 93.09 | 92.47 | 91.53 | 92.17 |
| Friability, wt. % loss, 10 min | 4.90 | 0.00  | 0.39  | 1.92  | 4.65  | 0.83  |
| ASTM 1692 Burn, in/min (BHA) | —     | —     | —     | —     | 2.09  | 1.90  |
| Butler Chimney Test          |       |       |       |       |       |       |
| Flame height, in             | —     | —     | —     | —     | >11   | >11   |
| Seconds to extinguish        | —     | —     | —     | —     | 13    | 17    |
| Wt. % retained               | —     | —     | —     | —     | 65.5  | 66.7  |

EXAMPLE XVIII

THANOL® R-650-X Formulations (Inventive Examples)

|                              | Q     | R     | S     | T     | U     |
|------------------------------|-------|-------|-------|-------|-------|
| Formulation, pbw         |       |       |       |       |       |
| THANOL R-650-X (OH=455)      | 25.6  | 26.5  | 26.7  | 26.3  | 26.8  |
| Polyol, Ex. VIII (OH=412)    | 11.0  | —     | —     | —     | —     |
| Polyol, Ex. XI (OH=332)      | —     | 11.3  | —     | —     | —     |
| Polyol, Ex. IX (OH=310)      | —     | —     | 11.4  | —     | —     |
| Polyol, Ex. XII (OH=428)     | —     | —     | —     | 11.3  | —     |
| Polyol, Ex. XIII (OH=375)    | —     | —     | —     | —     | 11.5  |
| FYROL PCF                    | 5.0   | 5.0   | 5.0   | 5.0   | 5.0   |
| Water                        | 0.3   | 0.3   | 0.3   | 0.3   | 0.3   |
| FREON R-11B                  | 13.0  | 13.0  | 13.0  | 12.5  | 12.5  |
| L-5420                       | 0.5   | 0.5   | 0.5   | 0.5   | 0.5   |
| FOMREZ UL-32                 | 0.01  | 0.01  | 0.01  | 0.01  | 0.01  |
| PAPI 27, index = 1.15, 1.1   | 44.6  | 43.4  | 43.1  | 44.1  | 43.4  |
| Times, seconds, mixing       | 6     | 6     | 8     | 4     | 4     |
| Times, seconds, cream        | 10    | 12    | 12    | 10    | 10    |
| Times, seconds, gel          | 40    | 43    | 46    | 36    | 37    |
| Times, seconds, tack free    | 59    | 62    | 65    | 47    | 51    |
| Times, seconds, rise         | 92    | 103   | 109   | 81    | 93    |
| Initial surface friability   | None  | None  | None  | None  | None  |
| Foam appearance              | Good  | Good  | Good  | Good  | Good  |
| Physical Properties      |       |       |       |       |       |
| Density, lbs/ft³             | 1.83  | —     | 1.97  | 1.74  | 1.76  |
| K-factor                     | —     | —     | —     | 0.121 | 0.123 |
| Compressive strength, psi    |       |       |       |       |       |
| with rise                    | 35.37 | 37.49 | 34.00 | 36.27 | 36.27 |
| against rise                 | 13.57 | 13.92 | 12.29 | 10.07 | 10.49 |
| Heat distortion, °C.         | 102   | 101   | 99    | 111   | 108   |
| % closed cells               | 92.31 | 94.11 | 93.03 | 92.69 | 91.87 |
| Friability, wt. % loss, 10 min | 3.77 | 0.36 | 0.00  | 2.14  | 5.08  |
| ASTM 1692 Burn, in/min (BHA) | —     | —     | —     | 1.96  | 1.87  |
| Butler Chimney Test          |       |       |       |       |       |
| Flame height, in             | —     | —     | —     | >11   | >11   |
| Seconds to extinguish        | —     | —     | —     | 14    | 13    |
| Wt. % retained               | —     | —     | —     | 67.1  | 65.8  |

EXAMPLE XIX

Preparation of Polyisocyanurate Foams

|                              | V     | W     | X     |
|------------------------------|-------|-------|-------|
| Formulation, pbw         |       |       |       |
| Polyol, Ex. IV (OH=179)      | 26.5  | —     | —     |
| Polyol, Ex. V (OH=132)       | —     | 32.4  | —     |
| CHEMPOL 30-2150 (OH=210)     | —     | —     | 23.7  |
| Silicone DC-193              | 0.5   | 0.5   | 0.5   |
| FREON R-11B                  | 12.0  | 12.0  | 12.0  |
| DABCO TMR-2[1]               | 1.5   | 1.5   | 1.5   |
| PAPI 27 or MONDUR MR Index = 5.24 | 59.5 | 53.6 | 62.3 |
| Times, seconds, mixing       | 6     | 6     | 3     |
| Times, seconds, cream        | 9     | 7     | 15    |
| Times, seconds, gel          | 21    | 50    | 18    |
| Times, seconds, tack free    | 23    | 55    | 21    |
| Times, seconds, rise         | 41    | 62    | 56    |
| Initial surface friability   | None  | None  | None  |
| Foam appearance              | Good  | Good  | Good  |
| Physical Properties      |       |       |       |

-continued

| | V | W | X |
|---|---|---|---|
| Density, lbs/ft$^3$ | 2.00 | 2.05 | 2.36 |
| K-factor | 0.128 | 0.124 | — |
| Compressive strength, psi | | | |
| with rise | 36.31 | 31.01 | 48.34 |
| against rise | 11.22 | 11.22 | 22.03 |
| Heat distortion, °C. | 216 | 178 | 224 |
| % closed cells | 92.20 | 92.70 | 91.91 |
| Friability, wt. % loss, 10 min | 23.30 | 8.05 | 10.40 |
| ASTM 1692 Burn, in/min (BHA) | 1.40 | 1.51 | — |
| Butler Chimney Test | | | |
| Flame height, in. | 6.0 | 6.5 | — |
| Seconds to extinguish | 12.2 | 11.8 | — |
| Wt. % retained | 90.3 | 89.6 | — |

[1]A tertiary amine catalyst product of Air Products and Chemicals, Inc.

It may be readily seen from many of the examples that the polyol mixtures of this invention work as well as polyol extenders as do commercially available materials. Many modifications may be made in the polyol mixtures of this invention and their method of production without departing from the spirit and scope of the invention which is defined only in the appended claims. For example, one skilled in the art could adjust the temperature, pressure, proportions and modes of additions to provide polyol mixtures that give foams with optimal properties.

I claim:

1. A mixture of aromatic polyols having hydroxyl and ester functionalities for use in preparing rigid foams, being produced by the process comprising
   a. esterifying a residue from dibasic acid manufacture which comprises one or more acids from the group consisting of glutaric acid, succinic acid and adipic acid, with an alkylene glycol to produce a polyester polyol and
   b. transesterifying a terephthalic ester waste stream with the polyester polyol reaction product from the previous step.

2. The mixture of aromatic polyols of claim 1 in which the alkylene glycol has the formula $$HO-(CH_2CHO)_n-H$$
$$\phantom{HO-(CH_2C}|$$
$$\phantom{HO-(CH_2CH)}R$$

where R is hydrogen or lower alkyl of 1 to 4 carbon atoms and n is from 1 to 3.

3. The mixture of polyols of claim 1 in which the alkylene glycol is a glycol waste stream.

4. The mixture of polyols of claim 1 in which the terephthalic ester waste stream is a residue from the manufacture of dimethyl terephthalate.

5. The mixture of polyols of claim 4 in which the dimethyl terephthalate residue contains dimethyl terephthalate and one or more by-products selected from the group consisting of substituted benzenes, polycarbomethoxy diphenyls, benzyl esters of the toluate family, dicarbomethoxy fluorenone, carbomethoxy benzocoumarins and carbomethoxy polyphenyls.

6. The mixture of polyols of claim 1 in which the terephthalic ester waste stream is selected from the group consisting of residue from the manufacture of polyethylene terephthalate.

7. The mixture of polyols of claim 1 in which the reactions are conducted at a temperature between 160° to 240° C. and at a pressure between one atmosphere and subatmospheric.

8. The mixture of polyols of claim 1 in which the average hydroxyl number of the resultant mixture is between 100 and 400.

9. A mixture of aromatic polyols having hydroxyl and ester functionalities for use in preparing rigid foams, being produced by the process comprising
   a. esterifying a residue from dibasic acid manufacture which comprises one or more acids selected from the group consisting of glutaric acid, succinic acid and adipic acid, with an alkylene glycol waste stream containing alkylene glycols of the formula $$HO-(CH_2CHO)_n-H$$
$$\phantom{HO-(CH_2C}|$$
$$\phantom{HO-(CH_2CH)}R$$

where R is hydrogen or lower alkyl of 1 to 4 carbon atoms and n is from 1 to 3, to produce a polyester polyol, and
   b. transesterifying a terephthalic ester residue which is selected from the group consisting of manufacturing waste streams of dimethyl terephthalate or polyethylene terephthalate and mixtures thereof, with the polyester polyol reaction product from the previous step, such that the reactions are conducted at a temperature between 160° to 240° C. and at a pressure between one atmosphere and subatmospheric and in which the average hydroxyl number of the resultant polyol mixture is between 100 and 400.

10. A method for making a mixture of aromatic polyols having hydroxyl and ester functionalities for use in preparing rigid foams, comprising
    a. esterifying a residue from dibasic acid manufacture which comprises one or more acids from the group consisting of glutaric acid, succinic acid and adipic acid, with an alkylene glycol to produce a polyester polyol, and
    b. transesterifying a terephthalic ester waste stream with the polyester polyol reaction product from the previous step.

11. The method of claim 10 in which
    a. the alkylene glycol is a glycol waste stream comprising alkylene glycols of the formula $$HO-(CH_2CHO)_n-H$$
$$\phantom{HO-(CH_2C}|$$
$$\phantom{HO-(CH_2CH)}R$$

where R is hydrogen or lower alkyl of 1 to 4 carbon atoms and n is from 1 to 3, and
    b. the terephthalic ester waste stream is a residue from the manufacture of dimethyl terephthalate or polyethylene terephthalate.

12. The method of claim 10 in which the reactions are conducted at a temperature between 160° and 240° C. and at a pressure between one atmosphere and subatmospheric.

13. The method of claim 10 in which the average hydroxyl number of the resultant mixture is between 100 and 400.

14. A rigid polyurethane foam obtained by reacting in the presence of a blowing agent and a catalyst of polyurethane formation an organic polyisocyanate and a polyol blend comprising
    a. from about 5 to 100 percent by weight of a mixture of aromatic polyols having ester functionalities which is the reaction product from (1) esterifying a residue from dibasic acid manufacture which comprises one or more acids from the group consisting of glutaric acid, succinic acid and adipic acid, with an alkylene glycol to produce a polyester polyol and (2) transesterifying a terephthalic ester waste stream with the polyester polyol reaction product from the previous step, and b. from about 95 to 0 percent by weight of a nitrogen-containing polyol which is the reaction product from (1) reacting one mode of phenol or nonylphenol with one to 2 moles of diethanolamine to give a Mannich reaction product and (2) subsequently reacting one mole of the Mannich reaction product with 2 to 3 moles of propylene oxide.

15. The rigid polyurethane foam of claim 14 in which the polyol blend has an average hydroxyl number in the range from 100 to 400.

16. The rigid polyurethane foam of claim 14 in which the blowing agent is trichlorofluoromethane.

17. A rigid polyisocyanurate foam which is obtained by reacting in the presence of a blowing agent and a trimerization catalyst of polyisocyanurate formation, an organic polyisocyanate and a mixture of aromatic polyols having ester functionalities which is the reaction product of the process comprising a. esterifying a residue from dibasic acid manufacture which comprises one or more acids from the group consisting of glutaric acid, succinic acid and adipic acid, with an alkylene glycol to produce a polyester polyol and b. transesterifying a terephthalic ester waste stream with the polyester polyol reaction product from the previous step.

18. The rigid polyisocyanurate foam of claim 17 in which the mixture of aromatic polyols have an average hydroxyl number in the range of 100 to 400.

19. The rigid polyisocyanurate foam of claim 17 in which the blowing agent is trichlorofluoromethane.

* * * * *